(12) United States Patent
Vasseur et al.

(10) Patent No.: US 8,259,584 B2
(45) Date of Patent: Sep. 4, 2012

(54) DYNAMIC REROUTE OF NETWORK TRAFFIC

(75) Inventors: Jean-Philippe Marcel Vasseur, Dunstable, MA (US); David Delano Ward, Los Gatos, CA (US); Stefano Benedetto Previdi, Rome (IT)

(73) Assignee: Cisco Technology, inc., San Jose, CA (US)

( * ) Notice: Subject to any disclaimer, the term of this patent is extended or adjusted under 35 U.S.C. 154(b) by 375 days.

(21) Appl. No.: 12/050,686

(22) Filed: Mar. 18, 2008

(65) Prior Publication Data

US 2009/0238074 A1    Sep. 24, 2009

(51) Int. Cl.
*G01R 31/08*    (2006.01)

(52) U.S. Cl. ........ 370/237; 370/400; 709/235; 709/239; 379/221.01

(58) Field of Classification Search .................. 370/237, 370/400, 232, 412, 228, 397; 709/235, 239, 709/242; 379/221.01
See application file for complete search history.

(56) References Cited

U.S. PATENT DOCUMENTS

| | | | |
|---|---|---|---|
| 5,912,877 A * | 6/1999 | Shirai et al. ................... | 370/228 |
| 6,510,219 B1 * | 1/2003 | Wellard et al. ........... | 379/221.01 |
| 6,556,541 B1 * | 4/2003 | Bare ............................ | 370/235 |
| 6,895,441 B1 * | 5/2005 | Shabtay et al. ............... | 709/238 |
| 7,254,138 B2 * | 8/2007 | Sandstrom ..................... | 370/412 |
| 7,567,512 B1 * | 7/2009 | Minei et al. ................... | 370/232 |
| 7,567,577 B2 * | 7/2009 | Thubert et al. ................ | 370/401 |
| RE40,903 E * | 9/2009 | Dolganow et al. ........... | 709/242 |
| 2006/0028991 A1 * | 2/2006 | Tan et al. ...................... | 370/237 |
| 2006/0198308 A1 * | 9/2006 | Vasseur et al. ............... | 370/238 |
| 2007/0159977 A1 * | 7/2007 | Dalal et al. .................... | 370/238 |
| 2007/0237160 A1 * | 10/2007 | Natarajan et al. ............. | 370/397 |
| 2008/0049622 A1 * | 2/2008 | Previdi et al. ................. | 370/237 |

\* cited by examiner

*Primary Examiner* — Michael Thier
*Assistant Examiner* — Vincelas Louis
(74) *Attorney, Agent, or Firm* — Schwegman, Lundberg & Woessner, P.A.

(57) ABSTRACT

In an example embodiment, a method is provided that receives a broadcast of available bandwidth from a first routing device. A congestion of traffic is detected along a downstream path to a second routing device. This second routing device is an immediate downstream neighbor. As such, an alternate path is established to the second routing device by way of the first routing device based on the available bandwidth in the network and a portion of the traffic is transmitted along the alternate path.

10 Claims, 8 Drawing Sheets

DYNAMIC REROUTE OF NETWORK TRAFFIC

FIELD

The present disclosure relates generally to computer networks. In an example embodiment, the disclosure relates to the dynamic reroute of network traffic.

BACKGROUND

Multiprotocol Label Switching (MPLS) Traffic Engineering Fast Reroute (FRR) has been a driving mechanism in the deployment of MPLS Traffic Engineering. In general, MPLS Traffic Engineering proposes a set of techniques to optimize network resources, provide ability to get bandwidth guarantees, and fast recovery. To optimize network resources and to improve network traffic quality of service, MPLS Traffic Engineering requires the deployment of meshes of Traffic Engineering label switched paths between a set of nodes (e.g. routers). A mesh potentially requires the deployment of a large number of label switched paths (e.g., N*(N−1) paths are required for a mesh between N routers). Such a full mesh may not be applicable to large scale environments that may involve hundreds of nodes in the mesh. Furthermore, a full mesh requires a complex control plane overhead.

BRIEF DESCRIPTION OF DRAWINGS

The present disclosure is illustrated by way of example and not limitation in the figures of the accompanying drawings, in which like references indicate similar elements and in which.

DESCRIPTION OF EXAMPLE EMBODIMENTS

In the following description, for purposes of explanation, numerous specific details are set forth in order to provide a thorough understanding of an example embodiment of the present disclosure. It will be evident, however, to one skilled in the art that the present disclosure may be practiced without these specific details.

Overview

A method is provided that receives a broadcast of available bandwidth in the network from a first routing device. A congestion of traffic is detected along a downstream path to a second routing device. This second routing device is an immediate downstream neighbor. As such, an alternate path is established to the second routing device by way of the first routing device based on the available bandwidth and a portion of the traffic is transmitted along the alternate path.

Example Embodiments

Figure 1:
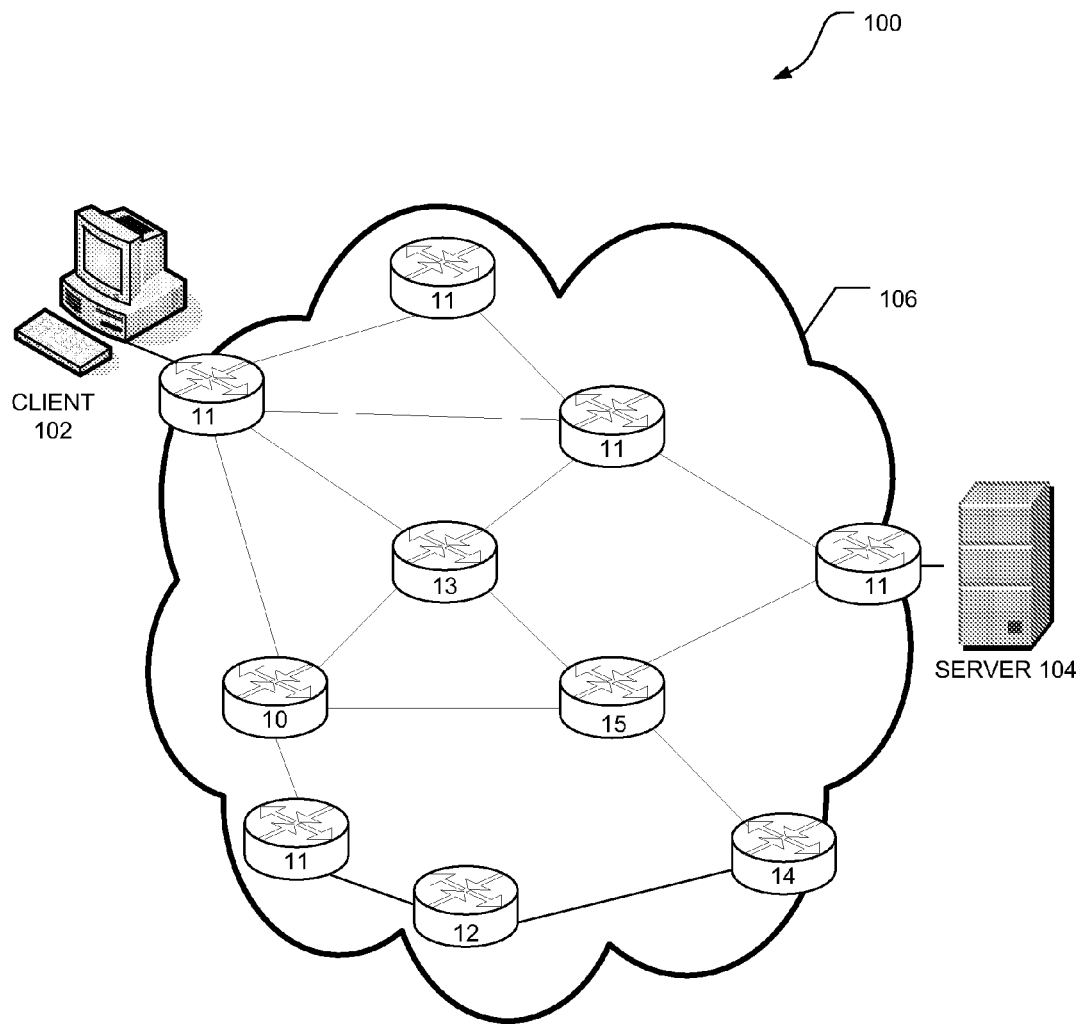
FIG. 1 depicts a simplified diagram of an example computer network.

FIG. 1 depicts a simplified diagram of an example computer network 100. Generally, computer network 100 is a geographically distributed collection of nodes interconnected by communication links and segments for transporting data between end nodes, such as client computer 102 and server 104. The computer network 100 may be further interconnected by one or more intermediate network nodes, such as routing devices 10-15. Examples of computer networks, such as computer network 100, include local area networks and wide area networks. A local area network connects the nodes over dedicated private communications links located in the same general physical location, such as a building or a campus. A wide area network, on the other hand, connects geographically dispersed nodes over long-distance communications links, such as common carrier telephone lines, optical lightpaths, synchronous optical networks (SONET), or synchronous digital hierarchy (SDH) links. The Internet is an example of a wide area network that connects disparate networks throughout the world, providing global communication between nodes on various networks. The nodes communicate over computer network 100 by exchanging discrete frames or packets of data according to predefined protocols, such as Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, interior gateway protocol (IGP), and other protocols.

It should be appreciated that groups of computer networks may be maintained as routing domains. A domain is a collection of nodes (e.g., routers, switches, and other nodes) under the control of one or more entities that present a common routing policy. To improve routing scalability, a service provider (e.g., an Internet service provider) may further divide a domain into multiple areas (or levels), such as area 106. Intra-domain areas are groups of contiguous networks and attached hosts. A number of nodes, routers, links, etc. may be used in computer network 100, and that the computer network of FIG. 1 shown herein is for simplicity. Further, computer network 100 is described in relation to area 106, but the computer network may apply to a variety of other network configurations, such as intra-domain, inter-AS, intra-area, intra-level, and other network configurations.

Figure 2:
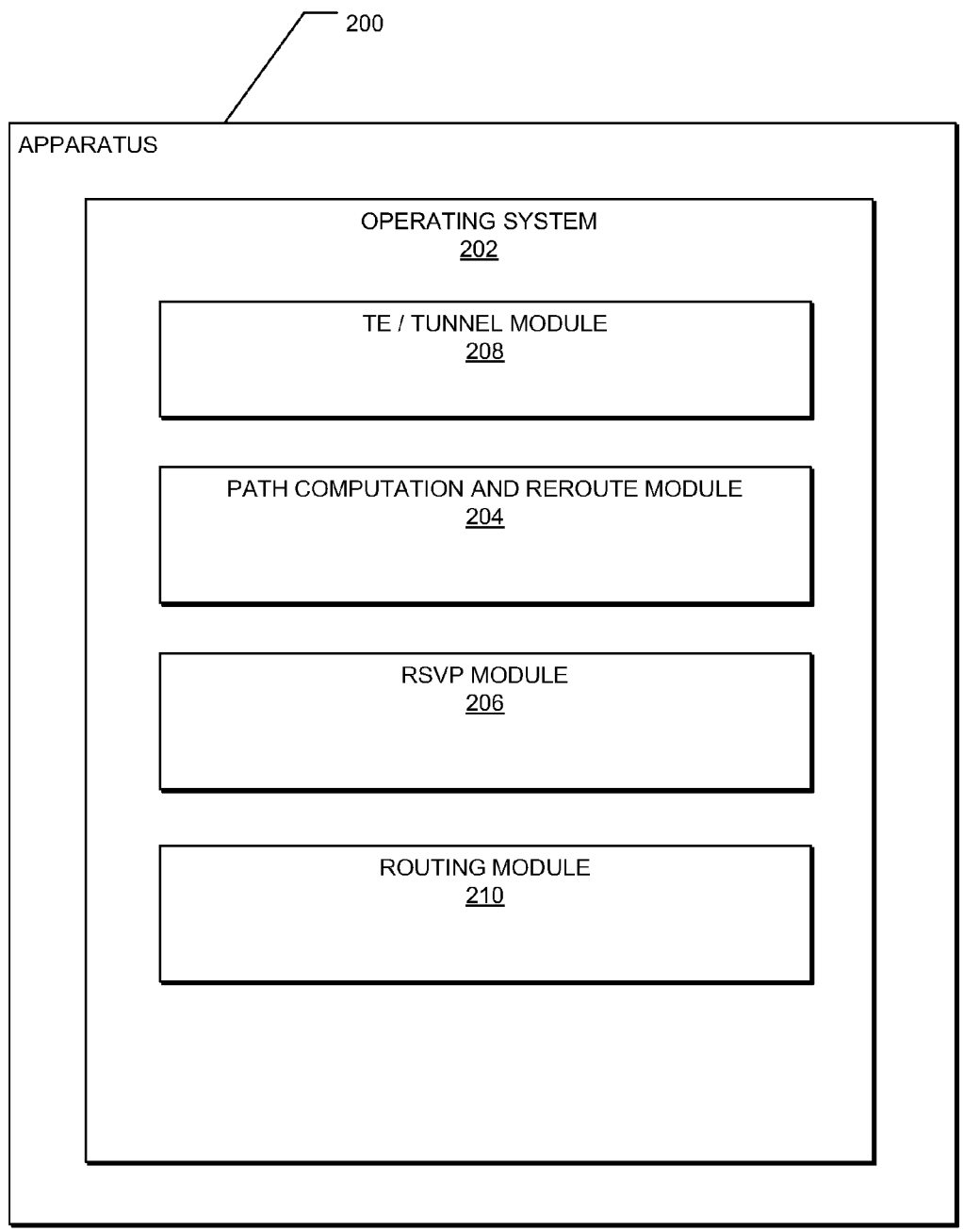
FIG. 2 depicts a simplified block diagram of modules included in an apparatus, in accordance with an example embodiment.

FIG. 2 depicts a simplified block diagram of modules included in an apparatus, in accordance with an example embodiment. Apparatus 200 includes operating system 202 (e.g., an Internetworking Operating System) that manages the software processes and/or services executing on the apparatus. As shown in FIG. 2, these software processes and/or services may include path computation and reroute module 204, traffic engineering (TE)/tunnel module 208, Resource Reservation Protocol (RSVP) module 206, and routing module 210. It should be appreciated that apparatus 200 may be deployed in the form of a variety of network devices that receives data for communication to other network devices, such as routers, switches or the like. For example, apparatus 200 may form a part of one of the routing devices depicted in FIG. 1, such as routing devices 10-15. An example of a routing device is a label switch router (LSR) that supports Multiprotocol Label Switching (MPLS). A label switch router is also a type of a router located in the middle of a Multiprotocol Label Switching (MPLS) network, described in more detail below, which is responsible for switching the labels used to route packets. A label is a short, fixed length, and locally significant identifier used to identify a forwarding equivalence class.

Referring to FIG. 2, routing module 210 performs functions provided by one or more routing protocols. Examples of routing protocols include IGP, Border Gateway Protocol (BGP), and other routing protocols. These functions may include the management of routing and the forwarding of information databases containing, for example, data used to make routing and forwarding decisions. Routing module 210 may also perform functions related to virtual routing protocols, such as maintaining virtual routing and forwarding instances.

Traffic Engineering (TE)/tunnel module 208 implements traffic engineering and tunnel functions. It should be appreciated that Multi-Protocol Label Switching Traffic Engineering (MPLS TE) has been developed to meet data networking requirements such as resource network optimization, guaranteed available bandwidth and fast restoration. MPLS TE uses label switching techniques to build end-to-end tunnels based on a series of constraints through an IP/MPLS network of label switch routers. These tunnels may be a type of label switched path (LSP) and thus are generally referred to as MPLS TE-LSPs. Accordingly, as used herein, it should be noted that a tunnel may be referred to as a "path" or "link" and such terms may be used interchangeably. Generally, a path is a logical structure that encapsulates a packet of one protocol inside a data field of another or the same protocol packet with a new header. In this manner, the data encapsulated within a TE-LSP may be transmitted following a route that differs from the route that would be determined by the Internet Protocol (IP) routing protocol. In other examples, the encapsulated data may be transmitted through networks that it would otherwise not be capable of traversing. A path establishes a transparent virtual network link between two network nodes that is generally unaffected by physical network links or devices (e.g., the physical network links or devices merely forward the encapsulated packet based on the new header). Examples of paths may include a label switched path, an MPLS TE-LSP, and other paths.

The paths may be signaled through the use of Resource Reservation Protocol (RSVP) protocol (with Traffic Engineering extensions), such as RSVP TE signaling messages. RSVP module 206 implements RSVP and processes RSVP messages. In traffic engineering applications, RSVP signaling is used to establish a path and to convey various path attributes to routing devices, such as area border routing devices, along the path. It should be noted that the use of RSVP serves merely as an example, and that other communication protocols may be used in accordance with the example embodiments described herein.

Path computation and reroute module 204 is configured to compute a path from one routing device to another routing device, to signal along the path, and/or to modify forwarding tables at intermediate routing devices along the path. Examples of path computation module and reroute module 204 include Path Computation Element (PCE) and Path Computation Client (PCC). As explained in more detail below, path computation and reroute module 204 may also be configured to reroute a portion of traffic along one or more alternate paths in the event that a path becomes congested.

It should be appreciated that in other example embodiments, apparatus 200 may include fewer or more modules apart from those shown in FIG. 2. For example, path computation and reroute module 204 may be separated into a path computation module that computes paths and another MPLS reroute module that reroutes traffic. The modules 204, 206, 208, and 210 may be in the form of software that is processed by a processor. In another example, modules 204, 206, 208, and 210 may be in the form of firmware that is processed by Application Specific Integrated Circuits (ASICs), which may be integrated into a circuit board. Alternatively, modules 204, 206, 208, and 210 may be in the form of one or more logic blocks included in a programmable logic device (e.g., a field-programmable gate array). The described modules may be adapted, and/or additional structures may be provided, to provide alternative or additional functionalities beyond those specifically discussed in reference to FIG. 2. Examples of such alternative or additional functionalities will be discussed in reference to the flow diagrams discussed below. The modifications or additions to the structures described in relation to FIG. 2 to implement these alternative or additional functionalities will be implementable by those skilled in the art, having the benefit of the present specification and teachings.

Figure 3:
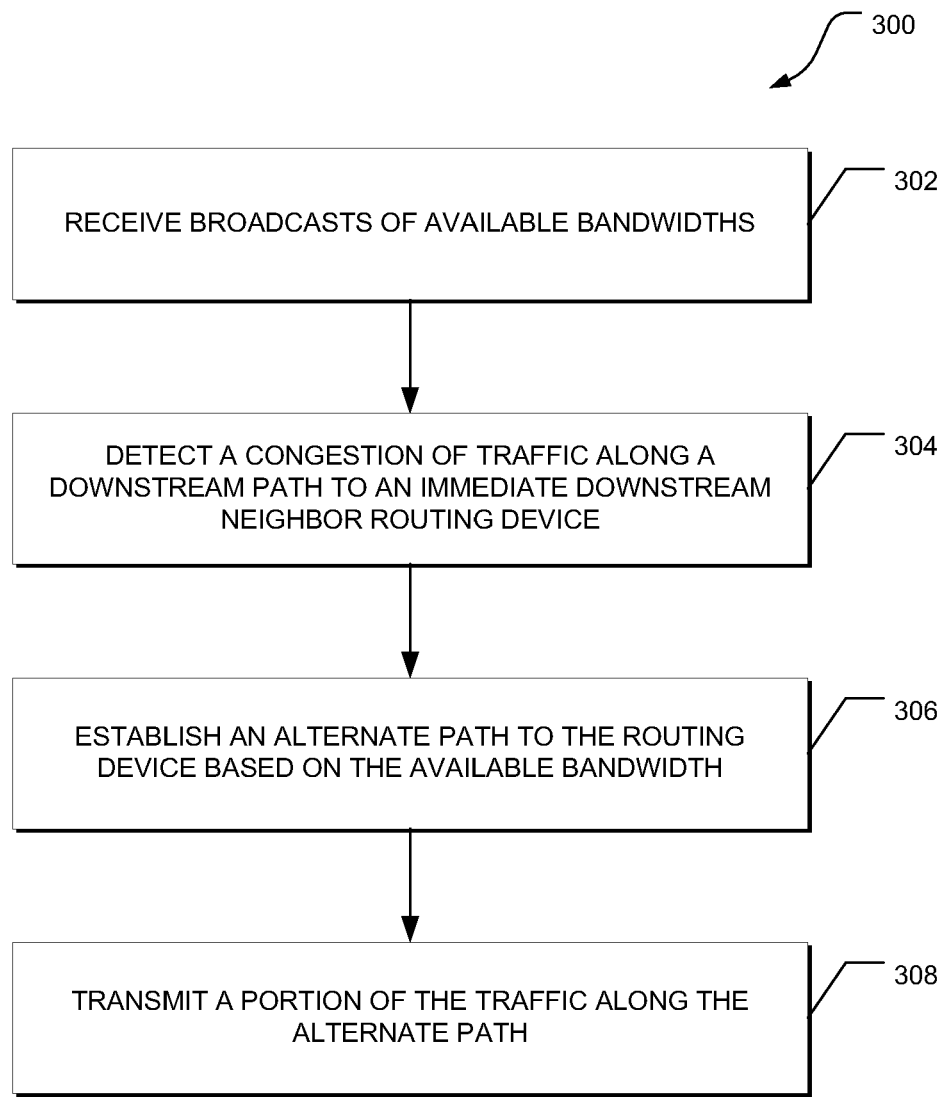
FIG. 3 depicts a flow diagram of a general overview of method, in accordance with an example embodiment, for dynamically rerouting a portion of traffic along an alternate path.

FIG. 3 depicts a flow diagram of a general overview of method 300, in accordance with an example embodiment, for dynamically rerouting a portion of traffic along an alternate path. In an example embodiment, method 300 may be implemented by path computation and reroute module 204 of FIG. 2, employed in an apparatus, such as routing devices 10-15 of FIG. 1. As depicted in FIG. 3, broadcasts or advertisements of available bandwidths from other routing devices are received at 302. An available bandwidth is the transmission capacity of a routing device that is free or available for use. The available bandwidth can be expressed as $$\text{Available Bandwidth} = (LS * \text{Threshold}) - LU \quad (1.0)$$

where the LS is the actual link speed of a link as measured by a routing device that is an immediate upstream neighbor, which is exampled in more detail below. The Threshold is a configurable threshold that defines the maximum tolerable link utilization for a link. The Threshold may, for example, be expressed as a percentage. The LU is the link utilization or the computed link utilization for a link. The link utilization may, for example, be the actual utilization at a specific time. In another example, the link utilization may be the average utilization over a period of time (e.g., several minutes) using a low pass filter.

At 304, a congestion of traffic is detected along a downstream path to a routing device that is an immediate downstream neighbor. Traffic is the flow of data and congestion is an excessive amount of traffic. As explained in more detail below, congestion is detected by measuring the link utilization and comparing the link utilization with a threshold. An immediate neighbor is a routing device that is the closest neighbor to another routing device. It should be appreciated that "downstream" refers to a direction of a flow of data (or traffic) that is received by a routing device. On the other hand, "upstream" refers to a direction opposite to that of a downstream direction.

If congestion along the downstream path is detected, then an alternate path to the immediate downstream neighboring routing device is established (or setup) at 306 based on the received available bandwidths. This alternate path follows a route along other routing devices that have the available bandwidths to accommodate the traffic. As explained in more detail below, the selection of routing devices used for the alternate path is partially based on the available bandwidths of the routing devices. After the alternate path is established, a portion of the traffic is transmitted or rerouted along the alternate path at 308. The portion of the traffic is rerouted along the alternate path until the traffic along the downstream path is not congested. Without congestion, the alternate path is removed (or torn down). Accordingly, the establishment and removal of the alternate paths between neighboring routing devices are dynamic, depending on the traffic between the neighboring routing devices.

Figure 4A:
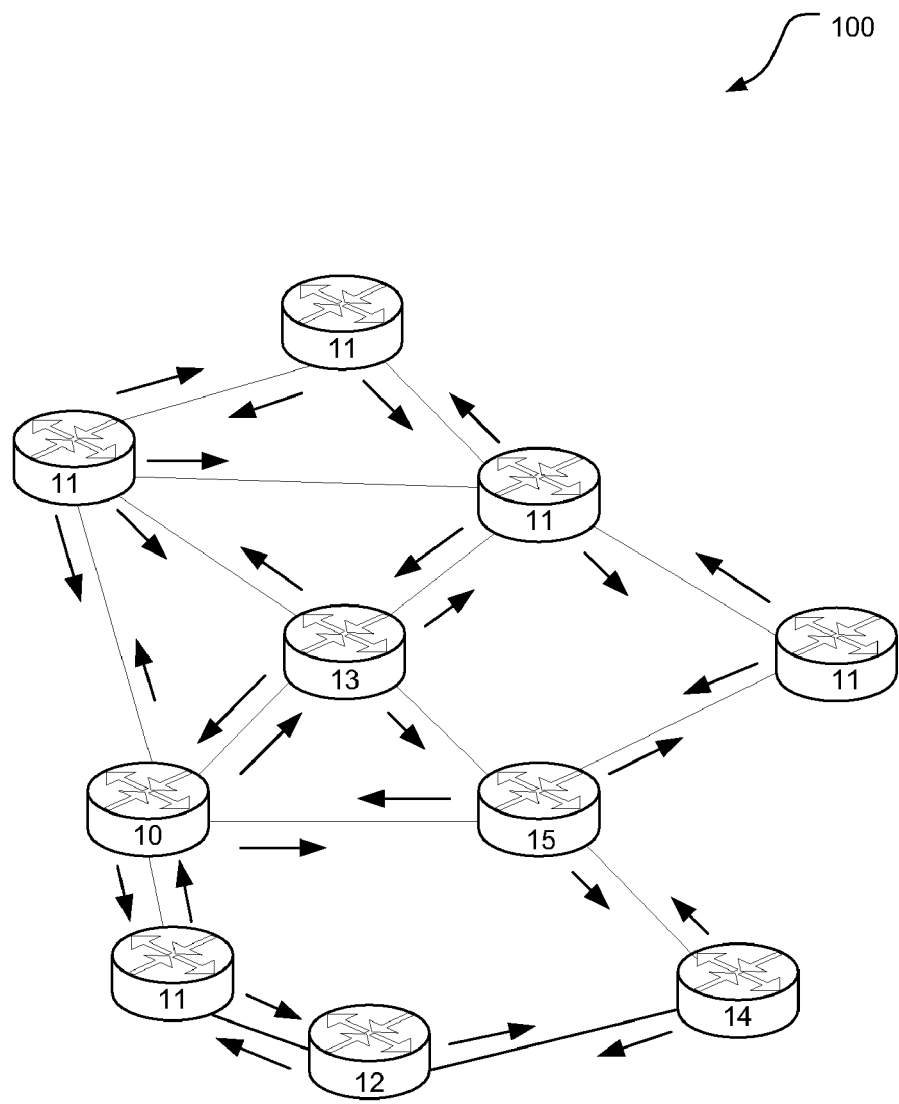
FIGS. 4a and 4b are diagrams depicting the dynamic reroute of traffic along an alternate path, in accordance with an example embodiment.
Figure 4B:
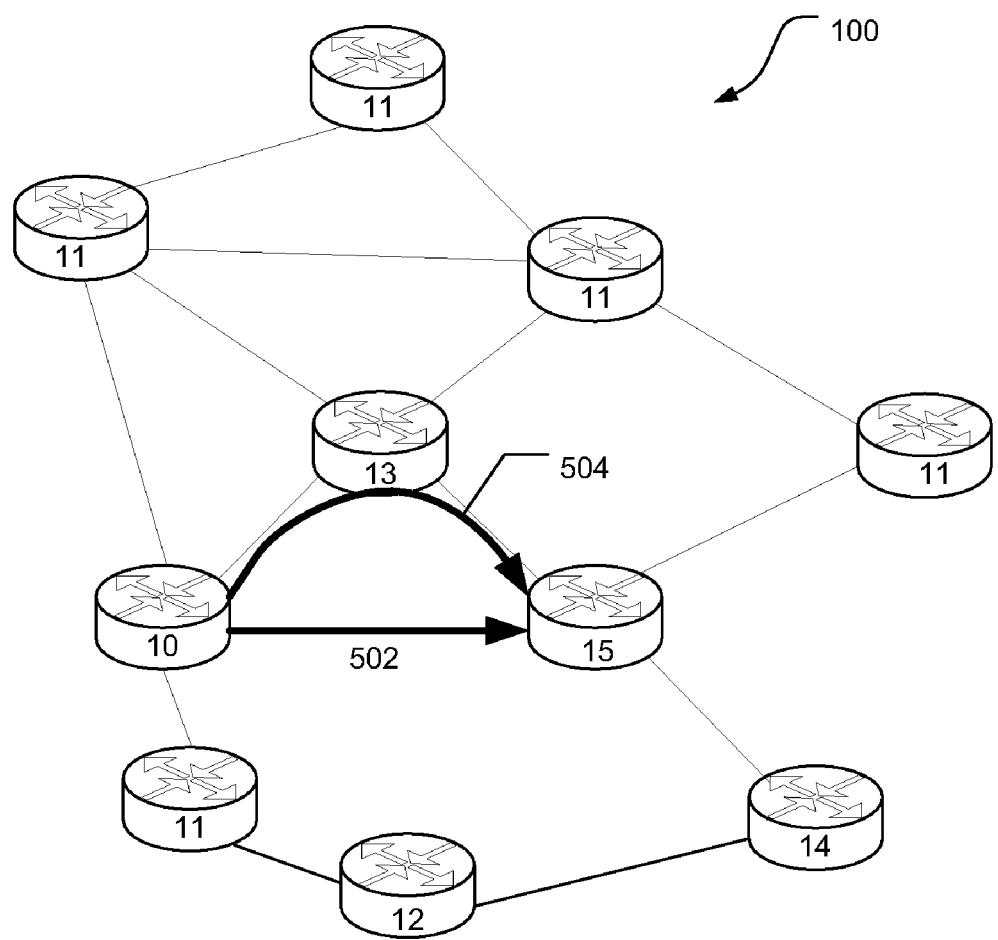

FIGS. 4a and 4b are diagrams depicting the dynamic reroute of traffic along an alternate path, in accordance with an example embodiment. FIG. 4a depicts the broadcast of available bandwidths. Computer network 100 is interconnected by routing devices 10-15. Each routing device, such as routing device 10, 11, 12 or 13, is configured to broadcast or advertise its available bandwidth to other routing devices. The broadcast allows each routing device to know or identify the available bandwidths of other routing devices. For example, FIG. 4a depicts the broadcast of available bandwidths (as depicted by the arrows) by routing devices 10-15. For example, routing device 10 broadcasts the available bandwidth on each of its local links as well as receiving available bandwidths transmitted by other routing devices 11-15. The broadcast may, for example, be performed using an IGP, which is a protocol used within a domain or area, such as Open Shortest Path First (OSPF) or Intermediate System to Intermediate System (IS-IS). Routing device 10 stores the available bandwidths from other routing devices 11-15 and, as explained in more detail below, may access this information to calculate one or more alternate paths to an immediate downstream neighboring routing device, such as routing device 15.

FIG. 4b depicts the establishment of alternate path 504 to immediate downstream neighboring routing device 15. With reference to routing device 10, routing device 10 detects a congestion of traffic along downstream path 502 to routing device 15, which is an immediate downstream neighbor. In an example, congestion may exist when link utilization of path 502 exceeds a certain threshold (or when Link Utilization>Threshold). This threshold may be pre-defined by a user or be based on a variety of variables. It should also be noted that the congestion may also be detected if, for example, the link utilization exceeds the threshold for a defined period of time.

With congestion along path 502 detected, routing device 10 establishes alternate path 504 to routing device 15 based on the available bandwidths of other routing devices 11-15. In this example, routing device 10 identifies a set of one or more routing devices from other routing devices 11-15 that has the bandwidth to accommodate a portion of the traffic to routing device 15. In an example, this portion may be the amount of traffic in excess (or above) of the threshold. This portion of traffic can be expressed as $$\text{Portion of Traffic} = LU - \text{Threshold} \qquad (2.0)$$

where LU is the link utilization, which is explained above. In the example of FIG. 4b, only routing device 13 has enough available bandwidth to handle the portion of traffic in excess of the threshold. As a result, routing device 10 establishes alternate path 504 by way of routing device 13 and transmits the portion of the traffic in excess of the threshold along the alternate path. It should be noted that the portion of the traffic rerouted along alternate path 504 should not itself create congestion. Accordingly, when identifying the routing devices from other routing devices 11-15 that have the bandwidths to accommodate a portion of the traffic to routing device 15, alternate path 504 may follow the constraint $$\text{Portion of Traffic} + \text{Available Bandwidth} < K*\text{Threshold} \qquad (3.0)$$

where K is a pre-defined constant. Alternatively, alternate path 504 may follow another constraint $$\text{Portion of Traffic} < \text{Available Bandwidth} \qquad (4.0)$$

if the Available Bandwidth takes into account the link utilization threshold on the other paths.

The routing device 10 maintains alternate path 504 for as long as traffic to routing device 15 along path 502 is congested. When routing device 10 detects non-congestion of traffic (or when Link Utilization<Threshold) for some defined period of time, the routing device removes (or tears down) alternate path 504 and routes the continuing traffic along path 502. It should be noted that a different threshold may be used to detect non-congestion. In an example, this different threshold may be lower than the initial threshold used to detect congestion. Accordingly, such a dual-threshold mechanism provides a range of high and low thresholds to trigger the establishment and removal of alternate path 504, respectively.

Figure 5:
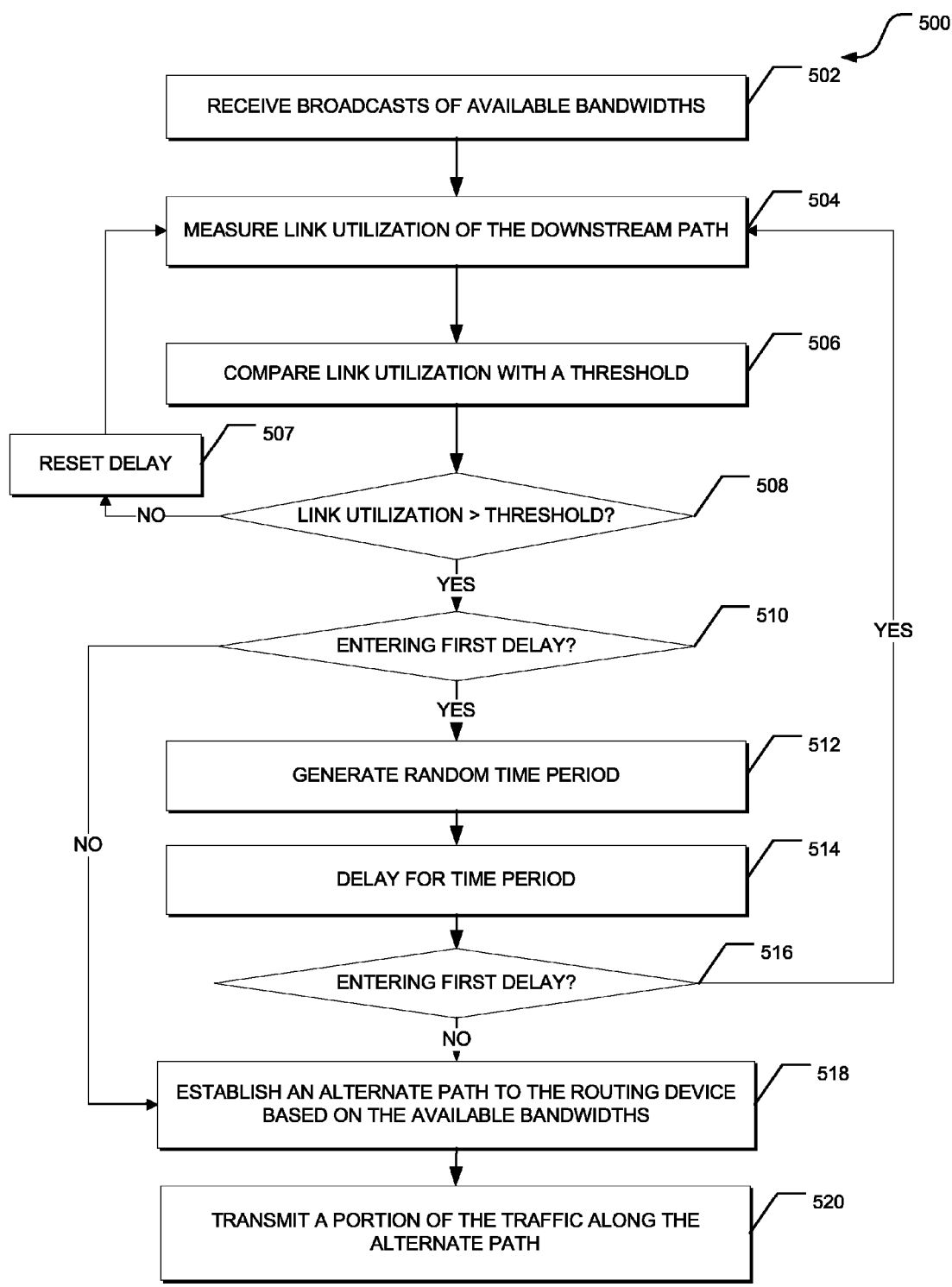
FIG. 5 depicts a flow diagram of detailed method, in accordance with an example embodiment, for dynamically rerouting a portion of traffic along an alternate path.

FIG. 5 depicts a flow diagram of detailed method 500, in accordance with an example embodiment, for dynamically rerouting a portion of traffic along an alternate path. In an example embodiment, method 500 may be implemented by path computation and reroute module 204 of FIG. 2, employed in an apparatus, such as routing devices 10-15 of FIG. 1. As depicted in FIG. 5, broadcasts of available bandwidths from other routing devices are received at 502. To identify whether there is congestion of traffic along a downstream path, the link utilization of the downstream path to a routing device that is an immediate downstream neighbor is measured at 504. The measured link utilization is then compared with a threshold at 506. In an example, congestion is defined as or identified when the link utilization exceeds the threshold. Conversely, non-congestion is defined as or identified when the link utilization falls below the threshold or a different threshold. As depicted at 508, if the link utilization is not greater than or falls below the threshold for some defined period of time, then the traffic along the downstream path is not congested. Accordingly, the link utilization is continuously measured at 504 and compared with the threshold at 506.

On the other hand, if the measured link utilization exceeds the threshold, then the traffic along the downstream path is congested. In an example embodiment, an alternate path can be computed and established immediately upon detection of congestion along the downstream path. However, in another example embodiment, the establishment of the alternate path can be delayed for a time period. The time period can be predetermined or can be random. After 508, a determination is made at 510 whether the routing device is entering into a first delay. Since this is the first delay, a random time period is generated at 512. In an example, the random time period may fall within a predefined time range. The establishment of the alternate path is then delayed for the random time period at 514. Another determination can be made at 516 whether the routing device is entering into the first delay. Since this is the first delay, the link utilization is measured again at 504 and compared with the threshold at 506 to identify whether congestion along the downstream path still exists after the delay. If congestion has cleared (no congestion) after the delay, then the count of the delay is reset at 507 and the link utilization is continuously measured thereafter.

However, if the congestion still exists after the delay, then another determination is made at 510 whether the routing device is entering into the first delay. Since the establishment of the alternate path has already been delayed once, an alternate path is established at 518 based on the available bandwidths received from other routing devices. The delay of the establishment of the alternate path may be included to avoid the simultaneous creation of multiple alternate paths by multiple routing devices, which may invalidate reroute decisions made by the routing devices. Furthermore, the delay may also filter out sporadic, short-termed congestions and therefore ensures that alternate paths are established when there is sustained congestion.

Still referring to FIG. 5, with the alternate path established, a portion of the traffic is transmitted along the alternate path at 520 to the immediate downstream neighbor. The link utilization of the downstream path is continuously measured after the alternate path has been established. The reroute of a portion of the traffic along the alternate path may relieve congestion of traffic along the downstream path. When non-congestion of traffic along the downstream path is detected (or when Link Utilization falls below different, lower Threshold), the alternate path may be removed. In an example embodiment, the removal of the alternate path may also be delayed for a time period. Similar to the delay mechanism discussed above, when non-congestion is initially detected, a random time period may be generated and the removal of the alternate path is then delayed for the random time period. In an example, the delay of the removal of the alternate path may be included to prevent the premature removal of the alternate path due to sporadic, short-termed drops in congestion, which may not be representative of traffic over a period of time.

Figure 6:
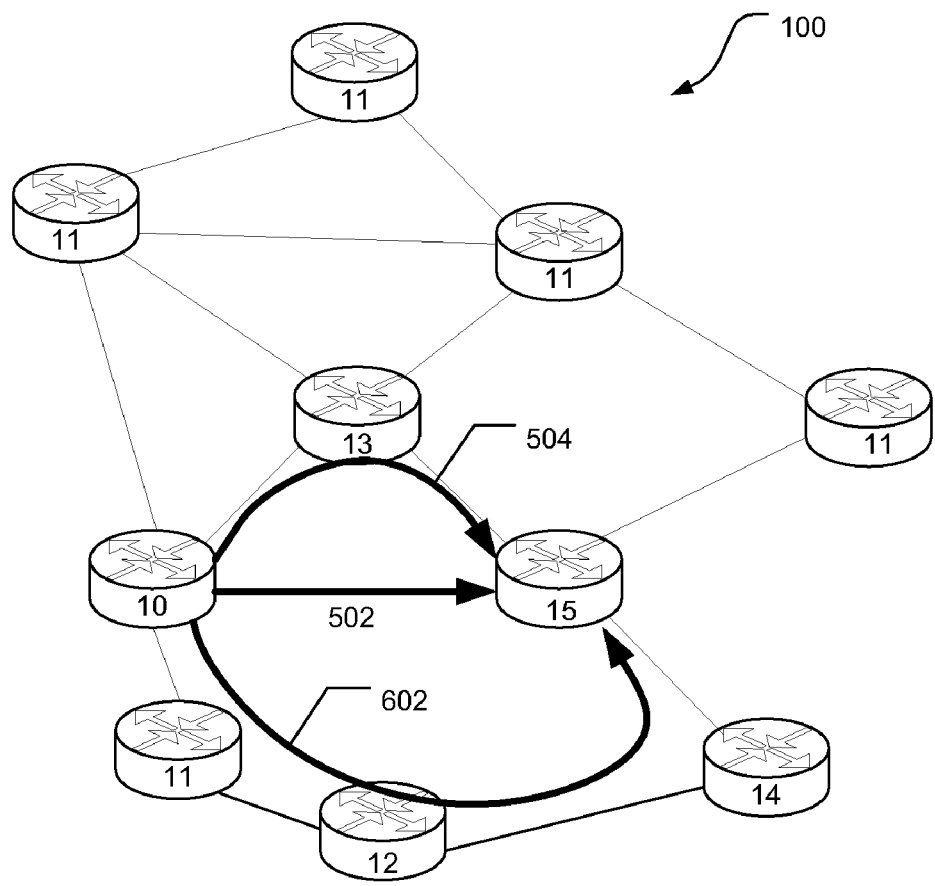
FIG. 6 depicts the establishment of multiple alternate paths, in accordance with an example embodiment, to immediate downstream neighboring routing device.

FIG. 6 depicts the establishment of multiple alternate paths 504 and 602, in accordance with an example embodiment, to immediate downstream neighboring routing device 15. With reference to routing device 10, routing device 10 detects a congestion of traffic along downstream path 502 to routing device 15 that is an immediate downstream neighbor. It should be appreciated that multiple alternate paths 504 and 602 may be established to relieve congestion along downstream path 502. With congestion along downstream path 502 detected, routing device 10 establishes alternate paths 504 and 602 to routing device 15 based on the available bandwidths of other routing devices 11-15. In this example, routing device 10 identifies routing devices 11-14 to have the bandwidths to accommodate portions of the traffic to routing device 15. As a result, routing device 10 establishes alternate path 504 by way of routing device 13 and alternate path 602 by way of routing devices 11, 12, and 14 and transmits portions of the traffic in excess of the threshold along alternate paths 504 and 602.

In an example embodiment, the establishment of alternate paths 504 and 602 may be delayed for random time periods. For example, before alternate paths 504 and 602 are established, routing device 10 may generate two random time periods. Routing device 10 initially delays the establishment of alternate path 504 for a first random time period. If congestion still exists along path 502 after the delay, routing device 10 establishes alternate path 504 and transmits a portion of the excess traffic along the alternate path. At the same time, routing device 10 may also delay the establishment of alternate path 602 for a second random time period that is different from the first random time period. If congestion still exists along path 502 after this delay, routing device 10 establishes alternate path 602 and transmits another portion of the excess traffic along the alternate path.

Figure 7:
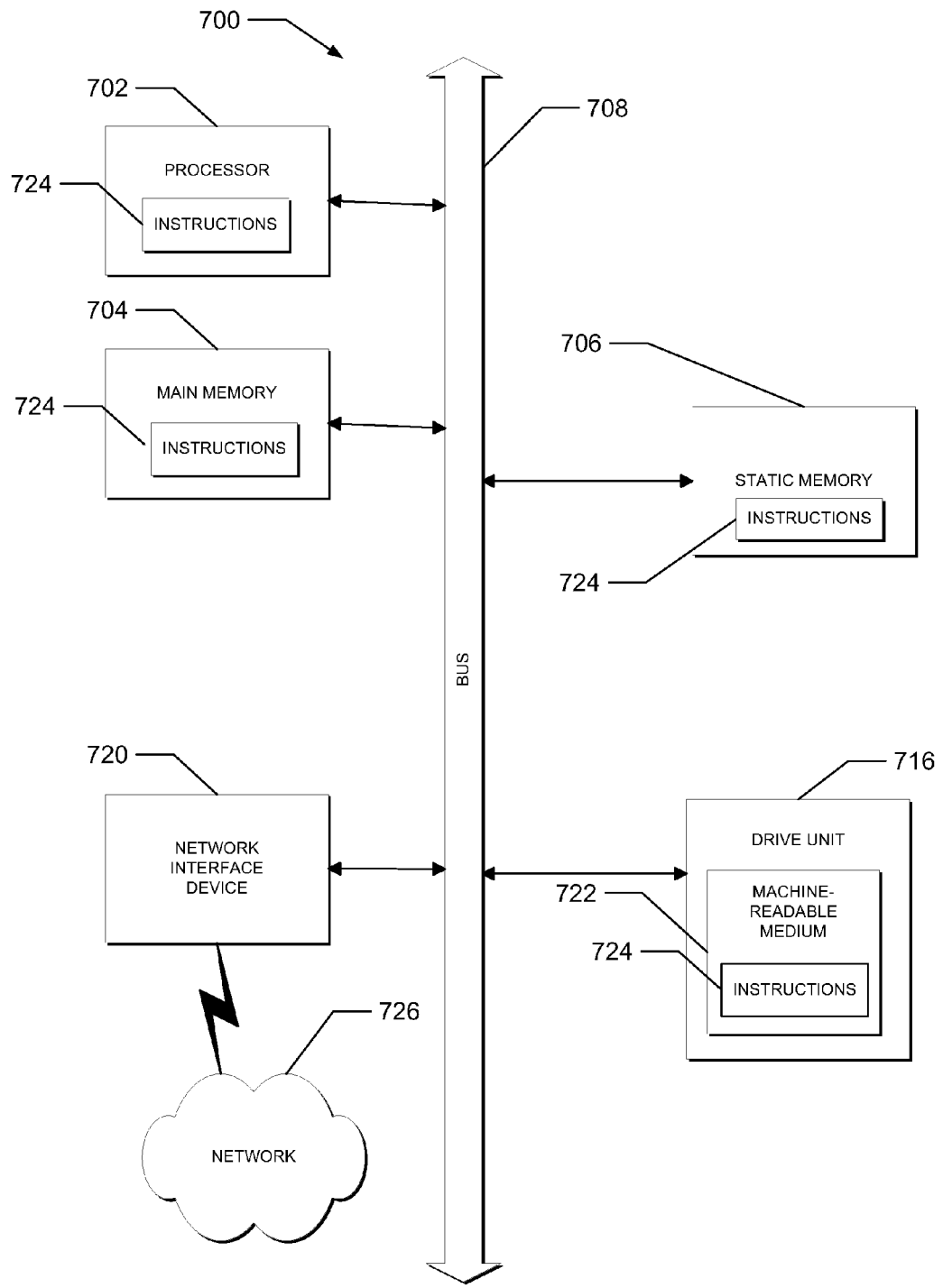
FIG. 7 is a simplified block diagram of a machine in the example form of a computing system within which a set of instructions, for causing the machine to perform any one or more of the methodologies discussed herein, may be executed.

FIG. 7 is a simplified block diagram of a machine in the example form of a computing system within which a set of instructions, for causing the machine to perform any one or more of the methodologies discussed herein, may be executed. In alternative embodiments, the machine may be connected (e.g., networked) to other machines. The machine may be a network router (e.g., label switch router), switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computing system 700 includes processor 702 (e.g., a central processing unit (CPU)), main memory 704 and static memory 706, which communicate with each other via bus 708. Computing system 700 may also include disk drive unit 716 and network interface device 720.

Disk drive unit 716 includes machine-readable medium 722 on which is stored one or more sets of instructions and data structures (e.g., software 724) embodying or utilized by any one or more of the methodologies or functions described herein. Software 724 may also reside, completely or at least partially, within main memory 704 and/or within processor 702 during execution thereof by computing system 700, with main memory 704 and processor 702 also constituting machine-readable, tangible media. Software 724 may further be transmitted or received over network 726 via network interface device 720 utilizing any one of a number of well-known transfer protocols (e.g., Hypertext Transfer Protocol (HTTP)).

While machine-readable medium 722 is shown in an example embodiment to be a single medium, the term "machine-readable medium" should be taken to include a single medium or multiple media (e.g., a centralized or distributed database, and/or associated caches) that store the one or more sets of instructions. The term "machine-readable medium" shall also be taken to include any medium that is capable of storing, encoding or carrying a set of instructions for execution by the machine and that cause the machine to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

While the invention(s) is (are) described with reference to various implementations and exploitations, it will be understood that these embodiments are illustrative and that the scope of the invention(s) is not limited to them. In general, techniques for detecting system battery errors may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

What is claimed is:

1. A method comprising:
receiving a broadcast of an available bandwidth from a first routing device;
detecting a congestion of traffic along a primary downstream path to a second routing device, the second routing device being an immediate downstream neighbor;
generating a random time period;
delaying an establishment of an alternate path for the random time period;
detecting a continued congestion of the traffic after the delay;
after detecting the continued congestion, establishing the alternate path to the second routing device by way of the first routing device based on the available bandwidth;
transmitting a portion of the traffic along the alternate path;
after establishing the alternate path, detecting a non-congestion condition along the primary downstream path to the second routing device;
after detecting the non-congestion condition, generating a second random time period;
detecting a continued non-congestion condition along the primary downstream path after the second random time period; and
after detecting the continued non-congestion condition, removing the alternate path.

2. The method of claim 1, wherein the detecting of the congestion of traffic includes:
measuring a link utilization of the primary downstream path to the second routing device; and
comparing the link utilization with a threshold,
wherein the alternate path is established when the link utilization exceeds the threshold and wherein the portion of the traffic is traffic in excess of the threshold.

3. The method of claim 1, wherein the primary downstream path is a label switched path.

4. Logic encoded in one or more tangible, non-transitory media for execution and when executed operable to:
receive a broadcast of an available bandwidth from a first routing device;
detect a congestion of traffic along a primary downstream path to a second routing device, the second routing device being an immediate downstream neighbor;
generate a random time period;
delay an establishment of an alternate path to the second routing device for the random time period;
after the delay, establish the alternate path to the second routing device by way of the first routing device based on the available bandwidth;
transmit a portion of the traffic along the alternate path;
after the alternate path is established, detect a non-congestion of the traffic along the primary downstream path to the second routing device;
after the non-congestion condition is detected, generate a second random time period;
detect a continued non-congestion condition along the primary downstream path after the second random time period; and
after the continued non-congestion condition is detected, remove the alternate path.

5. The logic of claim 4, wherein the detection of the congestion of traffic is further operable to:
measure a link utilization of the primary downstream path to the second routing device; and
compare the link utilization with a threshold,
wherein the alternate path is established when the link utilization exceeds the threshold and wherein the portion of the traffic is traffic in excess of the threshold.

6. The logic of claim 4, wherein the detection of the non-congestion of the traffic is further operable to:
measure a link utilization of the primary downstream path to the second routing device; and
compare the link utilization with a threshold,
wherein the alternate path is removed when the link utilization falls below the threshold.

7. An apparatus comprising:
at least one processor; and
a machine-readable, non-transitory medium in communication with the at least one processor, the machine-readable, non-transitory medium being configured to store a path computation and reroute module, the path computation and reroute module being executed by the at least one processor cause the operations to be performed, comprising:
receiving a broadcast of an available bandwidth from a first routing device;
detecting a congestion of traffic along a primary downstream path to a second routing device, the second routing device being an immediate downstream neighbor of the apparatus;
generating a random time period;
delaying an establishment of an alternate path to the second routing device for the random time period;
after the delay, establishing the alternate path to the second routing device by way of the first routing device based on the available bandwidth;
transmitting a portion of the traffic along the alternate path;
after establishing the alternate path, detecting a non-congestion condition of the traffic along the primary downstream path;
after detecting the non-congestion condition, generating a second random time period;
detecting a continued non-congestion condition along the primary downstream path after the second random time period; and
after detecting the continued non-congestion condition, removing the alternate path.

8. The apparatus of claim 7, wherein the apparatus is a label switch router.

9. The apparatus of claim 7, wherein the operations further comprise:
measuring a link utilization of the primary downstream path to the second routing device; and
comparing the link utilization with a first threshold,
wherein the alternate path is established when the link utilization exceeds the first threshold and wherein the portion of the traffic is traffic in excess of the first threshold.

10. The apparatus of claim 9, wherein the operations further comprise:
comparing the link utilization with a second threshold; and
removing the alternate path when the link utilization falls below the second threshold.

* * * * *